United States Patent Office

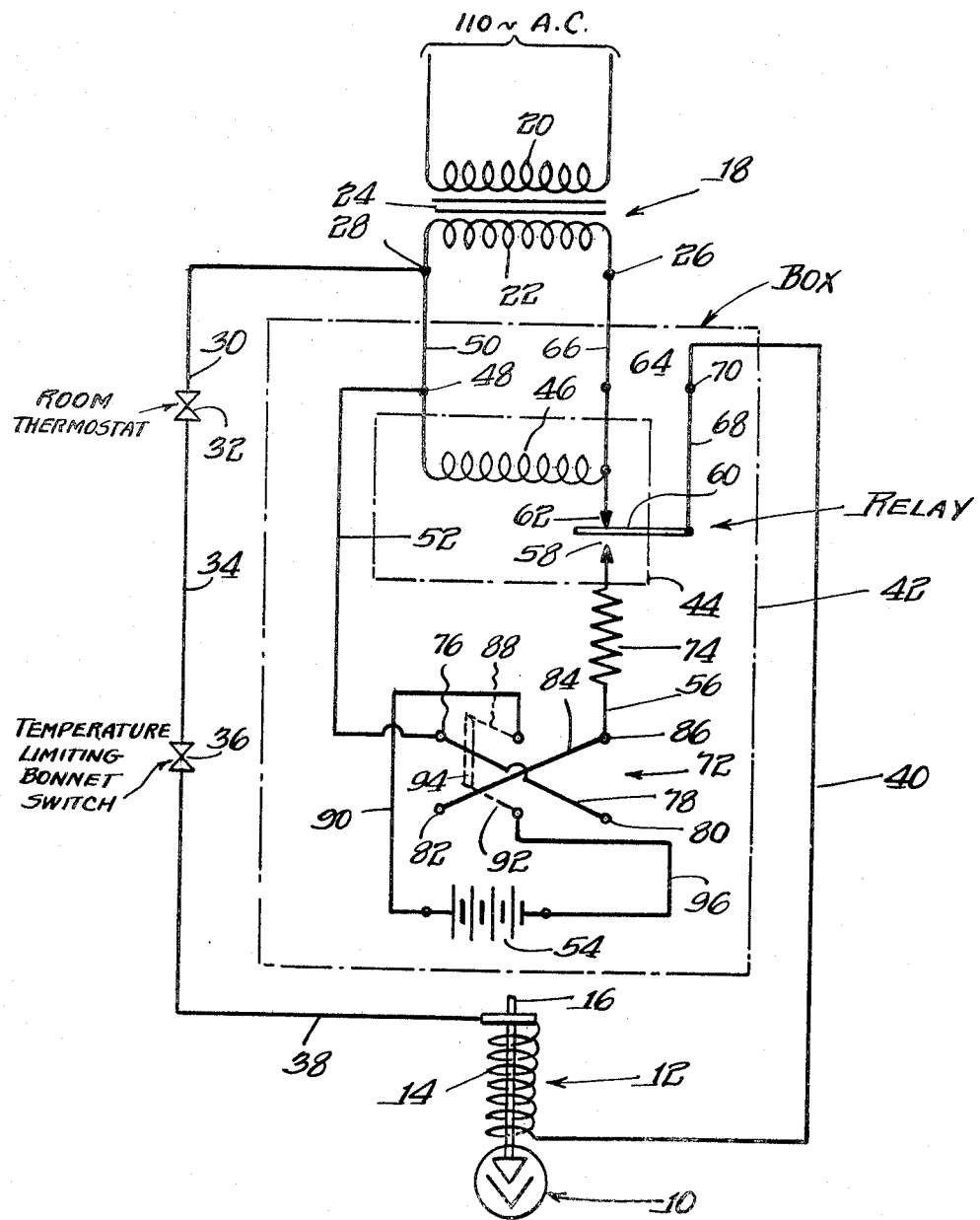

3,489,346
Patented Jan. 13, 1970

---

3,489,346
FURNACE EMERGENCY CONTROL
Carl G. Howard, 261 Lakeside Place,
Highland Park, Ill. 60035
Continuation-in-part of application Ser. No. 716,177,
Mar. 26, 1968. This application Nov. 14, 1968, Ser.
No. 775,598
Int. Cl. F23n 1/00; H02j 5/00
U.S. Cl. 236—9                          7 Claims

ABSTRACT OF THE DISCLOSURE

A standard gas burner and associated electric controls with the addition of a relay and a battery for stand-by operation of the burner valve in the event of power failure.

---

This application is a continuation-in-part of my co-pending and now abandoned application Ser. No. 716,177, filed Mar. 26, 1968, for Furnace Stand-by Control.

Gas-fired furnaces have become common and generally the preferred heating plants for home or residential use. The simplicity of gas furnaces and the cleanliness thereof are well known. New gas furnaces are generally incapable of manual operation. The main burner is supplied through a solenoid-operated valve which is electrically connected in series with a source of power and with a room thermostat to open the valve, and thus to turn on the burner whenever the space in which the thermostat is located requires heat. In addition, there is commonly provided a temperature limiting bonnet switch in the bonnet or plenum of a hot air furnace which is connected in series with the room thermostat and burner valve. In the case of hot water heating equipment, a water temperature switch is used in place of the bonnet switch. In either event, this additional switch is provided to prevent overheating of the furnace, which obviously could constitute a fire hazard.

The burner valve is normally operated at 24 volts alternating current, the power being derived from the house wiring through a step-down transformer. From time to time most electrical services are subject to breakdown or failure for greater or lesser periods of time. This may happen through an electrical storm when temperatures might not be sufficiently low to cause great inconvenience. However, interruptions in electrical service are often caused by the breaking of wires in ice or snow storms when the temperature is low enough that loss of heat is significant.

Accordingly, it is an object of the present invention to provide means for operating an electrically controlled gas furnace in the event of power failure.

More particularly, it is an object of the present invention to provide battery-operated emergency means for operating an electrically controlled gas furnace in the event of a power failure.

It is a further object of the present invention to provide an automatically operable, battery-powered stand-by control for operating an electrically controlled gas furnace in the event of a power failure.

Yet another object of the present invention is to provide resistance means insuring high current to open the gas valve, but thereafter limiting current to hold the valve open with lesser battery drain.

Still another object of the present invention is to provide battery-operated emergency means for operating an electrically controlled gas furnace in the event of power failure, which emergency means is provided with a reversing switch for minimizing transfer of material from one switch contact to another.

In accordance with the principles of the present invention, the normal electric operating circuit to the burner valve of a gas-fired furnace is interrupted by the interposition of a single-pole, double-throw relay. As long as the house wiring is in operative condition, voltage is applied to the relay, and the relay switch is connected so as to provide low voltage A.C. potential to the burner valve whenever the room thermostat closes. If there is a power failure of any sort, the relay drops out, and the switch contact thereof opens the A.C. circuit and closes a D.C. circuit including an 18-volt battery for opening the burner valve when the room thermostat closes.

An illustrative embodiment of the invention, as well as various further objects and advantages, will be apparent upon a study of the following description when taken in connection with the accompanying drawing wherein the single figure comprises a schematic wiring diagram of a furnace stand-by control constructed in accordance with the principles of the present invention.

Referring now in greater particularity to the drawing, the usual burner valve for a gas furnace is indicated at 10, and is openable by a solenoid 12 including a coil 14 and a plunger or armature 16. The coil is designed to be energized by 24 volts A.C., and this is derived from a transformer 18 having a primary 20 connected across the usual household A.C. line of nominal 110 volts. The transformer 18 also has a secondary 22 coupled to the primary with an iron core 24.

The secondary winding 22 has output terminals 26 and 28. The output terminal is connected by a wire 30 to a room thermostat 32. The thermostat is in turn connected by a wire 34 to a temperature limiting bonnet switch 36, and this is connected by a wire 38 to one end of the solenoid coil 14. The other end of the solenoid coil is connected to a wire 40, and this wire 40 normally leads to the terminal 26. However, in accordance with the present invention, the wire 40 does not lead to the terminal 26.

A housing or box 42 is provided, and within this housing or box is a single-pole double-throw relay 44. The relay 44 includes an actuating coil 46, and one end of this coil is connected at a terminal 48 to a wire 50 leading to the transformer terminal 28. The terminal 48 also is connected by means of a wire 52 to a double-pole double-throw reversing switch 72, and hence to one side of the battery 54. The opposite terminal of the battery 54 is connected through the switch 72 to a wire 56 leading through a resistor 74 to a first fixed relay contact 58.

The relay 44 also includes a movable contact 60, and the movable contact 60 normally engages the contact 58, as by spring pressure. However, when the coil 46 is energized, the movable contact 60 is pulled away from the fixed contact 58 into engagement with a second fixed contact 62. The second fixed contact 62 is connected to the opposite end of the coil or winding 46 relative to the terminal 48, and both the fixed contact 62 and the opposite end of the coil 46 are connected to a terminal 64. The terminal 64 is connected by a wire 66 to the transformer secondary winding terminal 26. The movable contact 60 is connected by means such as a wire 68 to a junction 70 to which the wire 40 is connected. The relay 44, like the solenoid 12, is intended to be energized by 24 volts A.C. However, I have found that solenoids intended for operation at 24 volts A.C. also work quite well on 18 volts D.C. Accordingly, the battery 54 is an 18-volt battery, and conveniently may comprise three series connected 6-volt lantern batteries housed within the box 42.

Returning to the double-pole double-throw switch 72, the wire 52 is connected to a first fixed contact 76 which is wired by means of a wire 78 to a third fixed contact 80. There is also a second fixed contact 82 which is connected by a wire 84 to a fourth fixed contact 86 which is connected to the wire 56. A first movable contact 88 is alternatively engageable with the first fixed contact 76 or the fourth fixed contact 86, and is connected by means of a wire 90 to one terminal of the battery 54. A second movable switch contact 92 is ganged with the first movable switch contact 88 as indicated at 94, and the second movable contact is connected by means of a wire 96 to the opposite terminal of the battery 54. Thus, the battery will be connected in series with the coil 14 of the valve solenoid 12 (through switch 72, wire 56, resistor 74, relay contacts 56, 60, wire 68, connection 70, wire 40, wire 38, temperature limiting bonnet switch 36, wire 34, room thermostat 32, wire 30, and wire 52) with the polarity in one direction when the movable switch contacts 88 and 92 are thrown to the left respectively in engagement with the fixed contacts 76 and 82, and with the opposite polarity when the movable switch contacts are thrown to the right, respectively in engagement with the fixed contacts 86 and 80. The double-pole double-throw switch should be reversed manually following each return to operation after a power failure. Thus, any tendency of metal to migrate from either of the relay contacts 58 and 60 to the other is substantially neutralized by the reversal of polarity for each operation.

Resistor 74 is in the nature of a current limiting resistor. The characteristics of the resistor are such that its resistance is quite low when it is cold, and is quite high when heated by the curemt it carries. Thus, a high current is supplied initially by the battery 54 to the coil 14 of the solenoid 12 to effect opening of the valve 10, since a relatively high current is required to open the valve, while the subsequent holding current is materially restricted, thus to increase battery life. Such resistors are well known in the art.

In normal operation with the A.C. power on, the relay coil 46 is energized, and the movable relay contact 60 is held against the second fixed contact 62. Thus, in effect, one end of the burner valve solenoid coil 14 is connected direct to the terminal 26 at one end of the transformer secondary, while the other end of the solenoid coil is connected through the bonnet switch 36 and the room thermostat 32 to the terminal 28 at the other end of the transformer secondary winding. Accordingly, upon closure of the room thermostat, the coil 14 of the solenoid 12 is energized, and the plunger 16 is retracted to open the valve 10. As will be understood, there is a gas pilot light, and this ignites the main burner upon opening of the valve 10. Upon opening of the room thermostat 32, the circuit is broken, and the solenoid coil 14 is deenergized, whereupon the burner valve 10 closes, and the main burner is shut down.

In the event that there is a power failure, the movable relay contact 60 drops from the fixed contact 62 to the first fixed contact 58. Thereupon the end of the coil 14 of the solenoid 12 is connected through the relay 44 to one end of the battery 54. The other end of the battery 54 is connected to the room thermostat, and then through the temperature limiting bonnet switch to the opposite end of the coil 14 of the solenoid 12. Upon closure of the room thermostat, the main gas valve is opened as before, and subsequently the main burner shuts down upon opening of the room thermostat and release of the solenoid coil.

It is to be borne in mind that with the electric power off, the motor for circulating air or water through the furnace also will not run. However, in most installations there will be convective circulation on a somewhat less efficient basis. Should the furnace tend to overheat in the absence of the blower or water-circulating pump, the connect switch 36 will open, thereupon shutting down the main valve through release of the solenoid 12, thus prevent overheating.

As noted heretofore, the solenoid and relay are both intended to operate on 24 volts A.C. However, the solenoid operates equally well on 18 volts D.C. due to the greater efficiency of solenoids when operated on D.C. As will be appreciated, the change-over from the A.C. line power to the stand-by battery is automatic upon failure of the A.C. line, and operation on the battery continues the same as the usual operation on A.C., except for the lack of forced circulation of the heating medium.

The specific example of the invention as herein shown and described is for illustrative purposes only. Various changes may well occur to those skilled in the art and will be understood as forming a part of the present invention insofar as they fall within the spirit and scope of the appended claims.

The invention is claimed as follows:

1. A furnace gas valve control in combination with a gas burner valve and solenoid for operating said valve, said solenoid having a coil, means comprising a source of A.C. voltage, room thermostat means, relay means including operating coil means, movable contact means, first fixed contact means normally engageable by said movable contact means with said coil means deenergized, second fixed contact means engageable by said movable contact means upon energization of said coil means, means connecting said operating coil means to said A.C. voltage source for energization of said coil means, means connecting said second fixed contact means to one side of said A.C. source, means connecting said movable contact means to one side of said solenoid coil, means connecting the other side of said solenoid coil through said room thermostat means to the other side of said A.C. source, a battery of sufficient capacity to maintain said solenoid energized indefinitely with D.C. potential, means connecting one side of said battery to said other side of said A.C. source, and means connecting the other side of said battery to said first fixed contact means to apply D.C. potential to said solenoid and to maintain said solenoid energized indefinitely with D.C. potential.

2. A furnace gas valve control as set forth in claim 1 and further including furnace temperature limit switch means in series with said thermostat means.

3. A furnace gas valve control as set forth in claim 1 wherein said relay means comprises a single-pole double-throw relay having one movable contact and first and second fixed contacts alternatively engageable thereby.

4. A furnace gas valve control as set forth in claim 1 wherein said A.C. voltage is of a predetermined potential, and wherein said battery has a potential equal to about one half said predetermined potential.

5. A furnace gas valve control as set forth in claim 4 wherein said relay means comprises a single-pole double-throw relay having a movable contact and first and second fixed contacts alternatively engageable thereby, and further including furnace temperature limit switch means connected in series with said room thermostat means.

6. A furnace gas valve control as set forth in claim 1, and further including reversing means connected in circuit with said battery and with said relay means first fixed contact and said movable contact for reversing the polarity of the battery as applied thereto and thereby to minimize transfer of material between said last two mentioned contact means.

7. A furnace gas valve control as set forth in claim 1 and further including resistance means in series between said battery and said solenoid coil, said resistance means being characterized in having a low resistance when cold and a high resistance when heated by the current it carries, whereby to provide a relatively high opening current to said solenoid coil and a relatively low holding current thereto.

References Cited

UNITED STATES PATENTS

| 855,450 | 6/1907 | Duncan | 307—66 |
| 1,951,663 | 3/1934 | Kriechbaum | 236—11 |
| 3,116,753 | 1/1964 | Howe | 307—66 |

EDWARD J. MICHAEL, Primary Examiner

U.S. Cl. X.R.

307—64